(12) United States Patent
Nevalainen et al.

(10) Patent No.: US 10,493,700 B2
(45) Date of Patent: Dec. 3, 2019

(54) METHODS FOR LOWERING MELT VISCOSITY AND IMPROVING HEAT-SEALABILITY OF POLYESTER AND FOR MANUFACTURING A HEAT-SEALED CONTAINER OR PACKAGE

(71) Applicant: Stora Enso OYJ, Helsinki (FI)

(72) Inventors: Kimmo Nevalainen, Kotka (FI); Ville Ribu, Lappeenranta (FI); Jari Räsänen, Imatra (FI); Outi Kylliainen, Imatra (FI); Ari Rosling, Turku (FI); Mohammad Khajeheian, Turku (FI); Jurkka Kuusipalo, Tampere (FI); Sami Kotkamo, Tampere (FI); Mikko Tuominen, Tampere (FI)

(73) Assignee: Stora Enso OYJ, Helsinki (FI)

( * ) Notice: Subject to any disclaimer, the term of this patent is extended or adjusted under 35 U.S.C. 154(b) by 119 days.

(21) Appl. No.: 15/113,560

(22) PCT Filed: Jan. 22, 2015

(86) PCT No.: PCT/IB2015/050488
§ 371 (c)(1),
(2) Date: Jul. 22, 2016

(87) PCT Pub. No.: WO2015/110980
PCT Pub. Date: Jul. 30, 2015

(65) Prior Publication Data
US 2017/0008226 A1 Jan. 12, 2017

(30) Foreign Application Priority Data
Jan. 24, 2014 (SE) ........................ 1400034

(51) Int. Cl.
| | |
|---|---|
| B29C 65/00 | (2006.01) |
| B29C 71/04 | (2006.01) |
| B32B 27/10 | (2006.01) |
| B29C 65/02 | (2006.01) |
| B32B 27/36 | (2006.01) |
| D21H 25/04 | (2006.01) |
| D21H 27/10 | (2006.01) |
| D21H 19/28 | (2006.01) |
| B29C 35/08 | (2006.01) |
| B29K 67/00 | (2006.01) |
| B29L 31/00 | (2006.01) |

(52) U.S. Cl.
CPC .... *B29C 66/73121* (2013.01); *B29C 35/0805* (2013.01); *B29C 65/02* (2013.01); *B29C 66/028* (2013.01); *B29C 66/4322* (2013.01); *B29C 66/71* (2013.01); *B29C 66/72328* (2013.01); *B29C 66/851* (2013.01); *B29C 71/04* (2013.01); *B32B 27/10* (2013.01); *B32B 27/36* (2013.01); *D21H 19/28* (2013.01); *D21H 25/04* (2013.01); *D21H 27/10* (2013.01); *B29C 2035/0827* (2013.01); *B29C 2035/0877* (2013.01); *B29K 2067/00* (2013.01); *B29K 2067/003* (2013.01); *B29K 2067/046* (2013.01); *B29L 2031/7132* (2013.01); *B32B 2270/00* (2013.01); *B32B 2307/31* (2013.01); *B32B 2307/7163* (2013.01); *B32B 2307/7244* (2013.01); *B32B 2307/7246* (2013.01); *B32B 2439/70* (2013.01)

(58) Field of Classification Search
CPC ................................................. B29C 66/73121
See application file for complete search history.

(56) References Cited

U.S. PATENT DOCUMENTS

| | | | |
|---|---|---|---|
| 5,693,373 A | 12/1997 | Kinsey, Jr. | |
| 2002/0065345 A1 | 5/2002 | Narita et al. | |
| 2006/0121249 A1 | 6/2006 | Muto et al. | |
| 2013/0137562 A1* | 5/2013 | Penttinen | B29C 65/02 |
| | | | 493/148 |

FOREIGN PATENT DOCUMENTS

| | | |
|---|---|---|
| CN | 101104706 A | 1/2008 |
| CN | 102858649 A | 1/2013 |
| CN | 103429503 A | 12/2013 |
| EP | 012026 A1 | 6/1980 |
| EP | 0171181 A2 | 2/1986 |
| EP | 0423499 A2 | 4/1991 |
| EP | 0756200 A1 | 1/1997 |
| EP | 1063260 A1 | 12/2000 |

(Continued)

OTHER PUBLICATIONS

Zenkiewicz et al., "Some composting and biodegradation effects of physically or chemically crosslinked poly(lactic acid)", Polymer Testing 31 (2012) 83-92. (Year: 2012).*

(Continued)

*Primary Examiner* — Daniel H Lee
(74) *Attorney, Agent, or Firm* — Greer, Burns & Crain Ltd.

(57) ABSTRACT

The invention relates to methods for lowering the melt viscosity and thereby improving heat-sealability of a polyester. The invention also relates to a method for manufacturing a heat-sealed container or package from fibrous-based, polyester-coated packaging material, and a method for heat-sealing polyester. The solution according to the invention is subjecting polyester to electron beam (EB) radiation. The lowered melt viscosity allows a lower heat-sealing temperature, and permits sealing of polyester to an uncoated fibrous surface. The preferred polyester for the invention is polylactide, as such or as blended with another polyester.

15 Claims, 5 Drawing Sheets

(56) References Cited

FOREIGN PATENT DOCUMENTS

Figure 1:
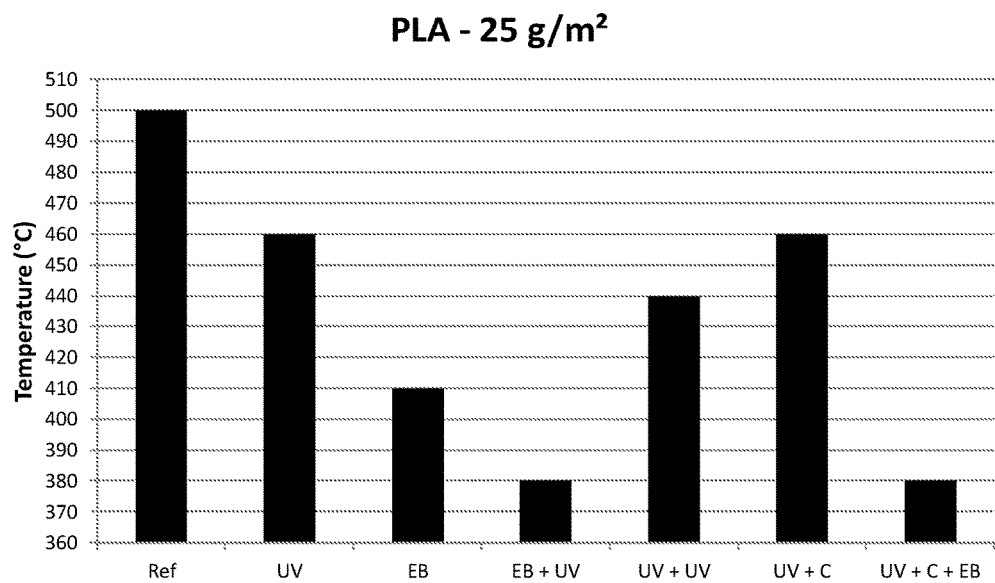

| | | |
|---|---|---|
| FR | 1447778 A | 7/1966 |
| JP | 54636461 B | 6/1968 |
| JP | S4910540B B | 5/1969 |
| JP | S5510302 B | 2/1971 |
| JP | 2005324834 A | 11/2005 |
| JP | 2010083060 A | 4/2010 |
| WO | 2011135182 A1 | 11/2011 |
| WO | 2012158511 A1 | 11/2012 |
| WO | 2013007872 A1 | 1/2013 |
| WO | 2013147392 A1 | 10/2013 |

OTHER PUBLICATIONS

Nitzl, Knut, New developments in the finishing of paper and plastic, Adhasion, vol. 31, No. 6, 1987, pp. 20-24. (Year: 1987).*

International Searching Authority, International Search Report, PCT/IB2015/050488, dated May 19, 2015.

Wang, Y., et. al. "Rheological and topological characterizations of electron beam irradiation prepared long-chain branched polylactic acid" Fran: Journal of applied polymer science, 2011, vol. 122, Nr. 3, s. 1857-1865.

Shin, B. Y., et. al. "Rheological and Thermal Properties of the PLA Modified by Electron Beam Irradiation in the Presence of Functional Monomer" Fran: Journal of Polymers and the Environment, 2010, vol. 18, Nr. 4, s. 558-566.

Zenkiewicz, M., et. al. "Material behaviour: Some composting and biodegradation effects of physically or chemically crosslinked poly(lactic acid)" Fran: Polymer testing, 2012, vol. 31, Nr. 1, s. 83-92.

Nitzl, Knut, Neue entwicklungen in der Papier—und Kunststoffveredelung, Adhaesion, vol. 31, No. 6, 1987.

European Search Report for corresponding European Application No. 15740565.5, dated Aug. 2, 2017.

Mitomo, Hiroshi, et al., Improvement of Heat Stability of Poly(L-lactic acid) by Radiation-Induced Crosslinking, Polymer 46 (2005) 4695-4703.

English Translation of Chinese Patent Office action for Chinese patent application No. 201580005775.0, dated Jun. 5, 2018.

* cited by examiner

METHODS FOR LOWERING MELT VISCOSITY AND IMPROVING HEAT-SEALABILITY OF POLYESTER AND FOR MANUFACTURING A HEAT-SEALED CONTAINER OR PACKAGE

This application is a U.S. National Stage under 35 U.S.C. § 371 of International Application No. PCT/IB2015/050488, filed Jan. 22, 2015, which claims priority to Swedish application No. 1400034-3 filed Jan. 24, 2014.

FIELD OF THE INVENTION

The invention relates to methods for lowering the melt viscosity and thereby improving heat-sealability of a polyester. The invention also relates to a method for manufacturing a heat-sealed container or package from fibrous-based, polyester-coated packaging material. The invention still further relates to a method for heat-sealing polylactide or other polyester.

BACKGROUND ART

In packaging technology heat-sealing is a conventional method for manufacturing or closing containers or packages made of polymer film or polymer-coated packaging material, such as paper, paperboard or cardboard. Low density polyethylene (LDPE) is a material commonly used in packages due to its easy heat-sealability. Furthermore, many other polymers are used in packages, for example polyesters, which, unlike LDPE, are biodegradable or have better water vapour and/or oxygen barrier properties than LDPE. These other polymers, however, are usually more difficult to heat-seal than LDPE, which is why they are not readily positioned as a surface layer but rather as an inner layer of a multilayer packaging material.

Polyethylene terephthalate (PET) is a polyester, which is frequently used in packages and containers, has good barrier properties, and is very heat-resistant, which is why it is suitable for the coating of ovenable food containers or packages or of baking cardboard, for instance. A disadvantage is that PET is difficult to heat-seal. Moreover, conventional PET is non-biodegradable.

A biodegradable polymer that is commonly used in biodegradable packages consisting of polymer film or polymer-coated paper or board is polylactide (PLA). Polylactide has relatively good water vapour and gas barrier properties, but has the problems of weak adhesion to a fibrous substrate and a high melting temperature, resulting in poor heat-sealability.

To improve the heat-sealability of polylactide US 2002-0065345 A1 describes blending of polylactide with a biodegradable aliphatic polyester made from a diol and a dicarboxylic acid, for example polycaprolactone (PLC) or polybutylene succinate adipate (PBSA), the portion of which in the mixture is at least 9%.

According to US 2005-0192410 A1 processability of polylactide is improved by blending polycaprolactone and mineral particles into it. US 2007-0259195 A1 further describes polylactide-based films and polymer coatings, which are extruded onto a fibrous substrate and wherein polybutylene adipate terephthalate (PBAT) is blended with polylactide to improve its heat-resistance.

WO 2011/110750 describes a polylactide-based double-layer coating, which is extruded onto a fibrous substrate and in which the outer layer has a larger portion of biodegradable polyester (other than polylactide) blended therewith than the inner layer, with an aim to optimize the adhesion between polylactide and the fibrous substrate and the heat sealability of polylactide.

When the heat-sealability of polylactide is improved by another polyester or similar additive blended therewith, there is the disadvantage that these additives are more expensive than polylactide. Furthermore, the blending of polymers constitutes an extra working step in the complex process.

A different approach is represented by WO 2011/135182, which teaches ultraviolet (UV) radiation of a polyester layer to improve its heat-sealability. According to tests the heat-sealing temperature is decreased, but any explanation why this is happening is not given. It also seems that the favourable effect is rather limited to polylactide only.

WO 98/04461 teaches use of electron beam (EB) radiation for improving heat-seals of polyolefins, such as low density polyethylene (LDPE), on a paperboard substrate. EB is said to induce cross-linking of the polymer and thus increase the molecular weight of same. The melt index of the polyolefin is significantly decreased, bringing an increase to melt viscosity and the melting point. Such an increase in fact detracts from the ease of heat-sealing by raising the heat-sealing temperature required, even though the strength of the seal may improve, which is the goal of these prior art teachings.

From the publications CN 101824211 A, CN 101735409 A and CN 101225221 A it is known to improve the heat-resistance of polylactide by subjecting it to electron beam (EB) radiation, which produces cross-linking while preserving biodegradability of the material. Cross-linking is secured by addition of a catalyst such as triallyl isocyanureate (TAIC). The prior art teachings relate to moulded articles or granules, but not to coatings on a fibrous substrate, in which adhesivity to the substrate and heat-sealability are required. As cross-linking increases the molecular weight and the melt viscosity of the polymer it would be expected to have an adverse effect on heat-sealability.

SUMMARY OF THE INVENTION

Hence there is still a need for an alternative solution to improve the heat-sealability of polyesters, with specific regard to the heat-sealing temperature. Likewise, there is a need to provide an improved method of manufacturing heat-sealed containers or packages by use of heat-sealable polyester as a coating in the packaging material.

The solution according to the invention, in general terms, is subjecting polyester to electron beam (EB) radiation. There is thus provided a novel method of lowering the melt viscosity of polyester, as well as a novel method of improving heat-sealability of a polyester, which are both characterized by said feature.

Furthermore, a novel method of manufacturing a heat-sealed container or package is provided, in which (i) a fibrous substrate is provided with a polymer coating, which comprises polyester, (ii) the coating is subjected to EB radiation, and (iii) the container or package is sealed by heat-sealing the coating polymer. Still further, a novel method of sealing polyester is provided, in which (i) EB radiation is directed to a surface comprising polyester, and (ii) thereafter the radiated surface is heat-sealed to a countersurface.

According to the invention, it has surprisingly been found that EB radiation (beta-rays) that is directed to a film or a coating layer that contains polyester, such as polylactide, alone or as blended with other polyesters, considerably improves the heat-sealability of the polyester by lowering the melt viscosity (shear viscosity of the melt) and thereby the required heat-sealing temperature. The finding is opposite to what happens with polyolefins, i.e. an increase of the melt viscosity as described in WO 98/04461. The finding is also an indication that in contrast to polyolefins EB radiation does not cross-link polyesters but rather breaks their polymeric chains and thereby turns melted polyester less viscous and easier to heat-seal. This is important, considering the generally high melting temperatures of polyesters and the ensuing difficulty of heat-sealing.

To secure reduced melt viscosity and a lower heat-sealing temperature it is pertinent to avoid any catalyst or other ingredient in the polyester that might promote cross-linking of the same in the EB treatment.

Another finding according to the invention is that adhesion of an extruded monolayer of polyester, such as PLA, to a fibrous substrate is improved by targeting EB radiation to the polyester. The poor adhesion of PLA has been previously solved by adding a separate adhesion layer between PLA layer and the substrate. By way of improved adhesivity the weight of the polyester layer on the fibrous substrate may be reduced, which brings cost savings.

EB radiation has a penetrating and ionizing effect on a polymer coating layer, while it is absorbed and gradually weakened by the polymer. As opposed to UV radiation, which only works by heating the surface of a polymer layer, without penetrating the layer to any greater depth, it is possible by adjusting the operating acceleration voltage to have the effect of EB radiation extended to the entire depth of the polymer layer, while burning or discolouring of the underlying paper or board substrate of fibrous-based packaging materials is avoided. Suitably the acceleration voltage is kept relatively low, at 100 keV or less.

The material can be a single or multilayer polymeric packaging film, or packaging paper, paperboard or cardboard, wherein a single or multilayer polymer coating is brought onto the fibrous substrate by laminating or extruding, its top layer that contains polyester being EB irradiated. A suitable absorbed dose of EB radiation is at least 20 kGy, preferably in the range of 20-200 kGy.

A suitable polyester for use in the invention is polylactide (PLA). When PLA constitutes the coating polymer of the fibre-based packaging material, such as paper or board, it can be extruded directly onto the board base without the need of an intermediate polymeric adhesive layer. PLA can be used as such or as blended with the other biodegradable polyesters, for instance polybutylene succinate (PBS). Alternatively an inner adhesive layer may be coextruded with an outer heat-seal layer of PLA or a blend thereof, which allows tailoring the outer heat-seal layer that will be EB irradiated merely for optimal heat-sealability. The invention allows heat-sealing of PLA or other polyester to an uncoated fibrous substrate, which is generally more challenging than usual polymer-to-polymer sealing.

Other polyesters useful in the invention include polyethylene terephthalate (PET) and polybutylene adipate terephthalate (PBAT).

The containers and packages which, according to the invention, can be heat-sealed from the fibre-based polymer-coated packaging material manufactured and EB irradiated as described above, include paperboard cups, such as disposable drinking cups, and paperboard or cardboard box and carton packages, such as confectionary, biscuit, flake, cereal, cosmetic, and bottle packages, and milk and juice cartons. The drinking cups can be polymer-coated on the inside and uncoated on the outside, whereby in the invention, the vertical seam of the cup is created by sealing the coating of the inner surface to the uncoated paperboard of the outer surface. In box packages, instead, the outer surface of the package can be polymer-coated and the inner surface uncoated, whereby in the sealing, the coating of the outer surface is heat-sealed to the uncoated board surface of the interior of the package. In cups, such as drinking cups, and in box packages, however, the board is often polymer-coated on both sides, whereby, according to the invention, the coating on one or both sides can be EB irradiated and, in the heat-sealing, the coating layers are sealed to each other. Also in this case, the EB radiation according to the invention improves the heat-sealability of polyester.

In the tests related to the invention, it has been observed that EB radiation improves the sealability of PLA or a mixture containing PLA in heat-sealing that is carried out with hot air.

In addition to the polyester-coated fibre-based packaging materials, the invention also relates to polyester-based packaging films, in particular, the heat-sealability of which the EB radiation improves. According to the invention the surface layer of the film may contain PLA as such or as a blend with another polyester, for instance PBS, and regarding the heat sealability of the film, the same essentially applies as presented above with respect to the polymer-coated packaging papers and boards that comprise PLA.

According to the invention it is possible to combine EB and UV irradiatons by subjecting polyester film or coating first to UV radiation according to the teachings of WO 2011/135182, incorporated herein by reference, and then to EB radiation as described herein. An opposite order of the steps, i.e. EB irradiation preceding UV irradiation, is possible as well.

Addition of flame treatment as a further step is found to be beneficial as well. Especially when PET is used as the polyester, a flame treatment step performed before or after EB radiation considerably lowers the heat-sealing temperature.

Even infrared (IR) and plasma treatments are contemplated as additions, which are expected to enhance heat-sealability.

EXAMPLES

In the following, the invention is described in more detail by means of application examples and tests conducted.

An example of the preferred implementations of the invention is to co-extrude, onto paper or cardboard made of kraft, CTMP or mechanical pulps, the weight of which is 40-500 g/m$^2$, a multilayer coating that has an innermost adhesion layer of a weight of 5-20 g/m$^2$ that consists of biodegradable polyester (other than PLA), such as PBAT or PBS, or a blend of PLA (40-95 weight-%) and other biodegradable polyester (5-60 weight-%), such as PBAT or PBS, and an outermost heat-sealing layer of a weight of 5-20 g/m$^2$ that consists of PLA or a blend of PLA (40-80 weight-%) and other biodegradable polyester (20-60 weight-%), such as PBAT or PBS. A middle layer of PLA with a weight of 5-20 g/m$^2$ may be located between innermost and outermost polymer blend layers. The other side of the paper or cardboard can be left uncoated. The polymer-coated web is conveyed past an EB radiator, with its coated side towards the device, at a velocity of 5-600 m/min, preferably 200-600 m/min. The EB-irradiated web is cut into blanks, which are heat-sealed into containers, such as cardboard drinking cups, or packages, such as packing boxes or cartons. The sealing can be performed with hot air, whereby the air temperature can be about 360-470° C. For materials that are irradiated more intensively, that is, at a slower web velocity, the air temperature required for a complete sealing is lower than for materials that receive less radiation. Instead of hot air, sealing jaws can be used, the temperature of which can be about 130-160° C.; also in this case, the lowest for materials that are irradiated the most.

Also preferred are monolayer coatings of PLA, blends of PLA and PBS, blends of PLA and PBAT, and PET. Such monolayer coatings may have a weight of 15-60 g/m$^2$, preferably 25-40 g/m$^2$.

Instead of a moving web, the EB radiation can also be directed to the sealing lines of a web or blank that is stationary with respect to the radiator, which lines thus receive a larger portion of radiation, while the other parts of the polymer surface are not exposed to radiation. Tray blanks consisting of PET-coated baking cardboard may be cited as an example.

For the tests of FIGS. 1-4 monolayers of polyester coating were extruded onto one side of a paperboard base and subjected to various treatments for the determination of their effect on the heat-sealing temperature. The treatments were ultraviolet irradiation of 21 kW, electron beam irradiation of a dosage of 100 kGy, corona treatment of 3400 W, and flame treatment by use of an excess of oxygen (at web velocity of 150 m/min). In the figures these have been marked as "UV", "EB", "C" and "F"; respectively. Combinations of these treatments were included in the tests also. For each test sample the initiation heat-seal temperature was measured, as the temperature of hot sealing air at an electrically heated air nozzle before hitting the surface of the coat layer. At the temperatures indicated the polymer had melted sufficiently for perfect sealing with the uncoated reverse side of the board. The requirement is that an attempted opening of the seal results in tearing within the fibrous board base.

FIG. 1 is a diagram showing the heat-seal temperatures (° C.) for a monolayer coating of mere PLA, having a weight of 25 g/m$^2$. It is seen that EB treatment according to the invention markedly improves heat-sealability by decreasing the heat-sealing (hot air) temperature from 500° C. down to 410° C. A clear improvement on UV treatment may be noted also. The best result, the heat-sealing temperature down to 380° C., was achieved by performing the EB and UV treatments in succession. Addition of a corona treatment had no measured effect on the heat-sealing temperature.

Figure 2:
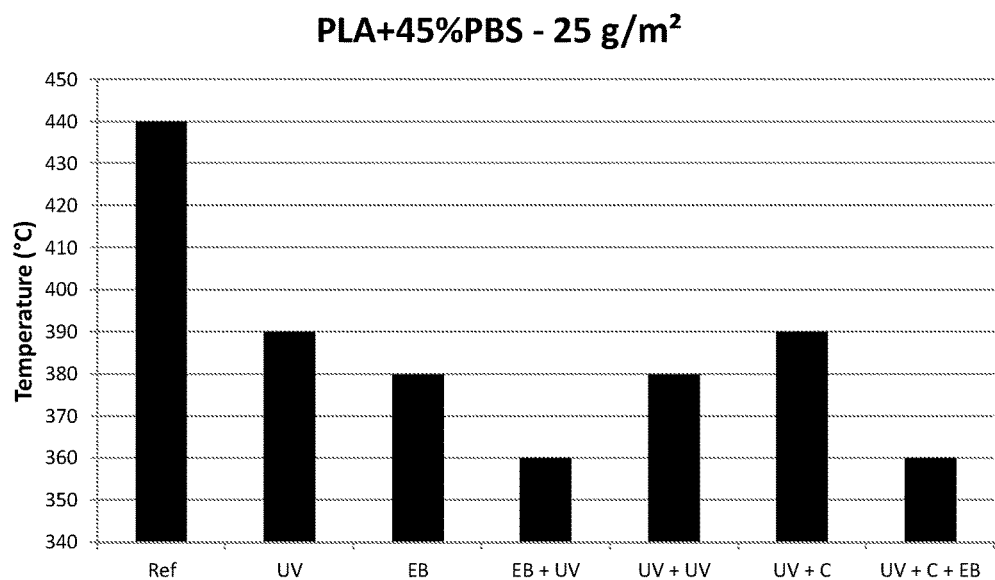

The tests of FIG. 2 correspond to those of FIG. 1, except that the coating polymer was a blend of 55 wt-% of PLA and 45 wt-% of PBS. There is an overall decrease of heat-sealing temperatures as compared to 100% PLA, and once again EB treatment and EB and UV treatments combined affected the heat-sealability favourably, bringing the heat-sealing temperature from initial 440° C. (no treatment) down to 380° C. or 360° C., respectively.

Figure 3:
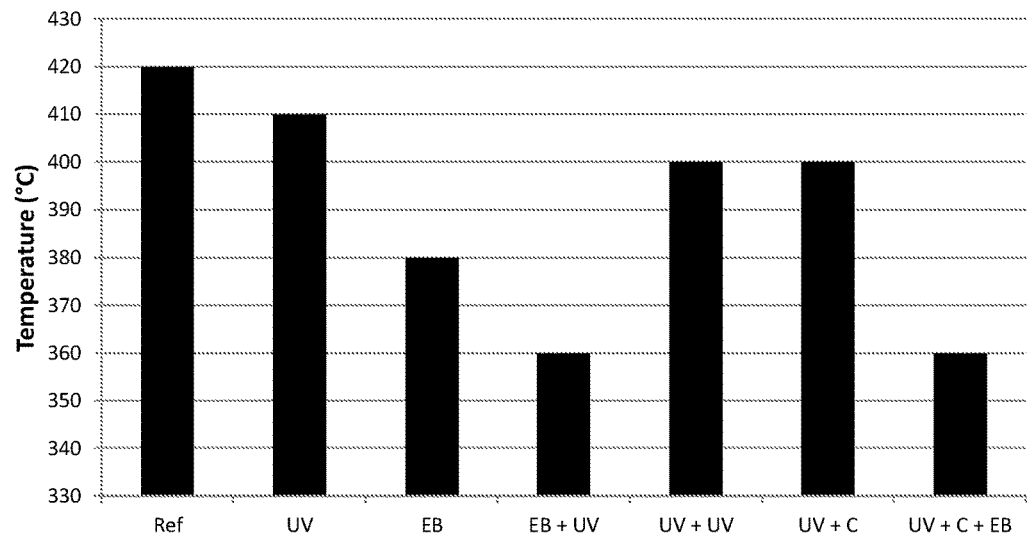

The tests of FIG. 3 correspond to those of FIG. 1, except that the coating polymer was a blend of 45 wt-% of PLA and 55 wt-% of PBAT. There is an even greater overall decrease of heat-sealing temperatures as compared to 100% PLA, and once again EB treatment and EB and UV treatments combined affected the heat-sealability favourably, bringing the heat-sealing temperature from initial 420° C. (no treatment) down to 380° C. or 360° C., respectively.

Figure 4:
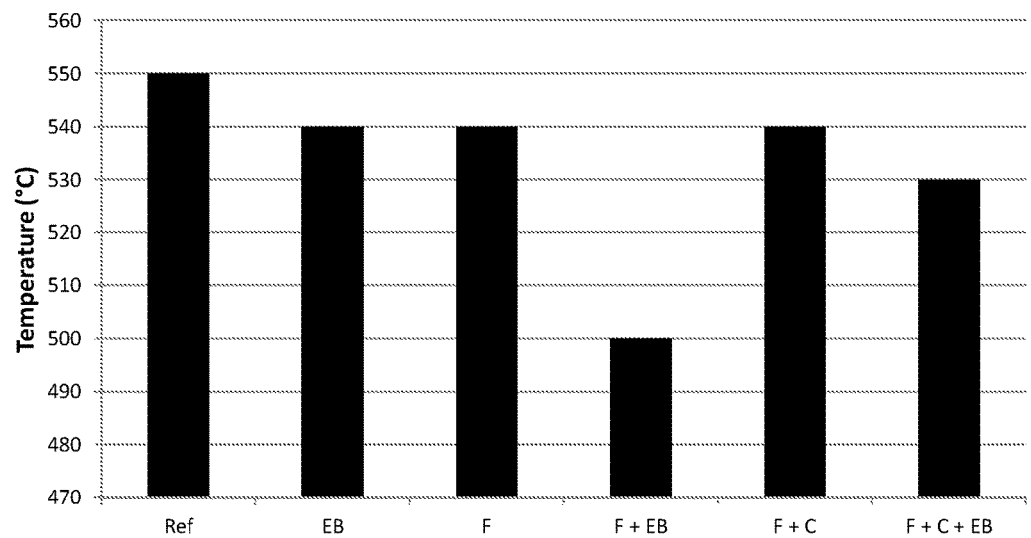

FIG. 4 shows the results from tests carried out with an extruded monolayer of PET having a coating weight of 40 g/m$^2$. EB treatment according to the invention improved heat-sealability by decreasing the heat-sealing (hot air) temperature from 550° C. down to 540° C. A marked further improvement, the heat-sealing temperature down to 500° C., was achieved by addition of flame treatment to precede the EB treatment. On the other hand an added corona treatment between the F and EB steps proved to have an adverse effect on the result.

Figure 5:
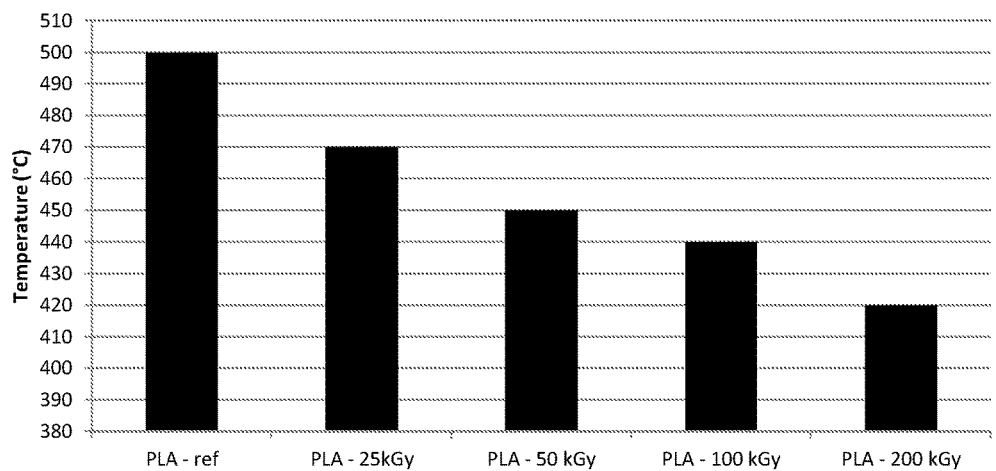

In FIG. 5 there are shown results from another test series carried out with a monolayer of 35 g/m$^2$ of PLA extruded onto one side of a paperboard base. Here the aim was to test the effect of different dosages of EB radiation measured as kGy. It is seen that the effect, decreased heat-sealing (hot air) temperature, increases as the radiation dosage is increased from zero (ref=no treatment) gradually up to 200 kGy. However, a lower dosage level of about 100 kGy is deemed to be preferable, as the increased degree of broken polymer chains may adversely affect properties of the polymer such as its mechanical strength.

Figure 6:
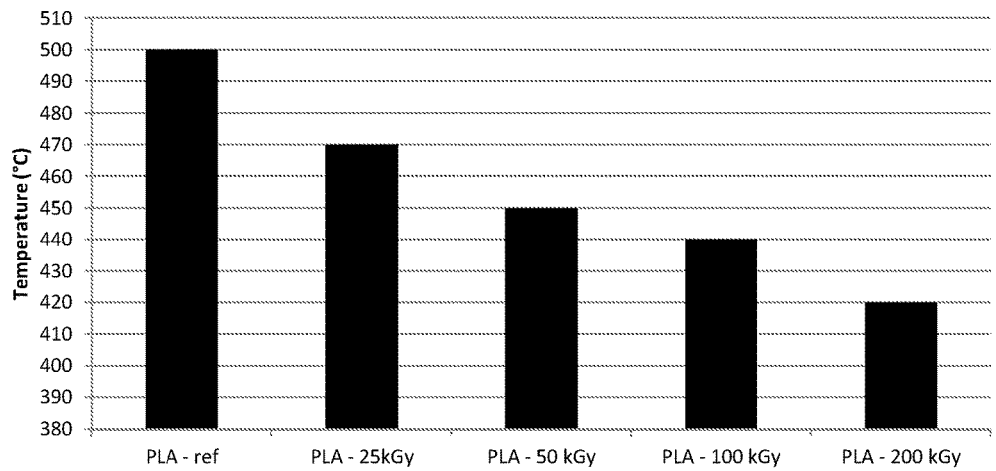

FIG. 6 comprises results from a test series corresponding to that of FIG. 5 but performed with a monolayer of 40 wt-% of PLA and 60 wt-% of PBS. Once more the heat-sealing temperature decreases as a function of increased radiation dosage.

Figure 7:
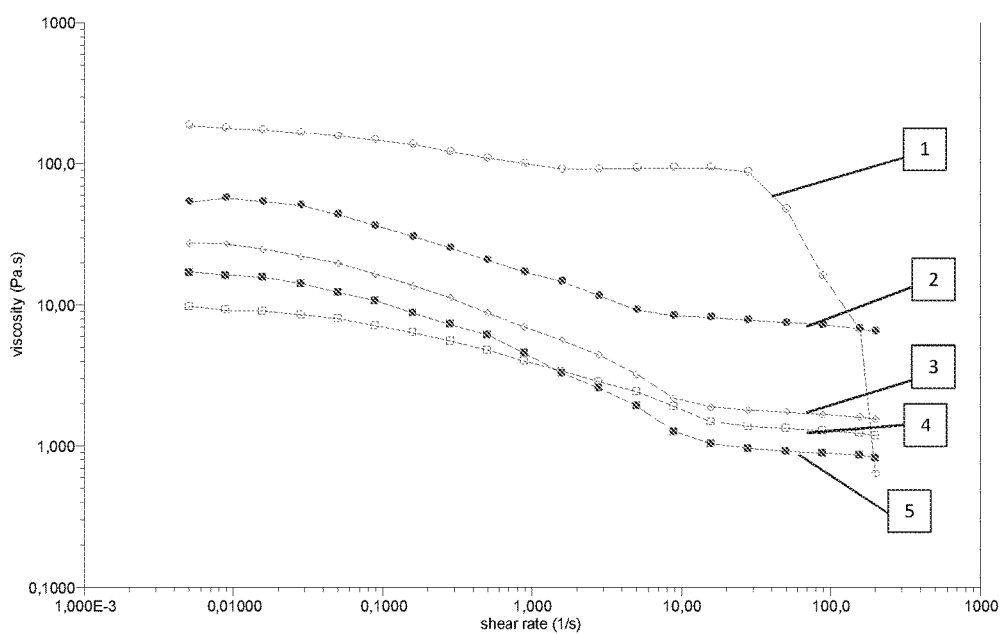

FIG. 7 shows graphs plotting measured melt (shear) viscosities to shear rates from extruded PLA film, which has been remelted at 240° C. for the measurements. Graph 1 represents as reference an untreated film, and graphs 2-5 represent films EB treated before remelting with EB radiation dosages of 25 kGy, 50 kGy, 100 kGy and 200 kGy, respectively. The conditions in heat-sealing are estimated to correspond to shear rates of about 5 to 50 1/s. It will be seen that the melt viscosity consistently decreases as the radiation dosage is increased, suggesting that there is no marked cross-linking of the polymer, but rather, polymer chains are broken due to the EB irradiation. This finding is well in line with the observed improved heat-sealability, i.e. the decreased hot air temperatures required for heat-sealing.

Figure 8:
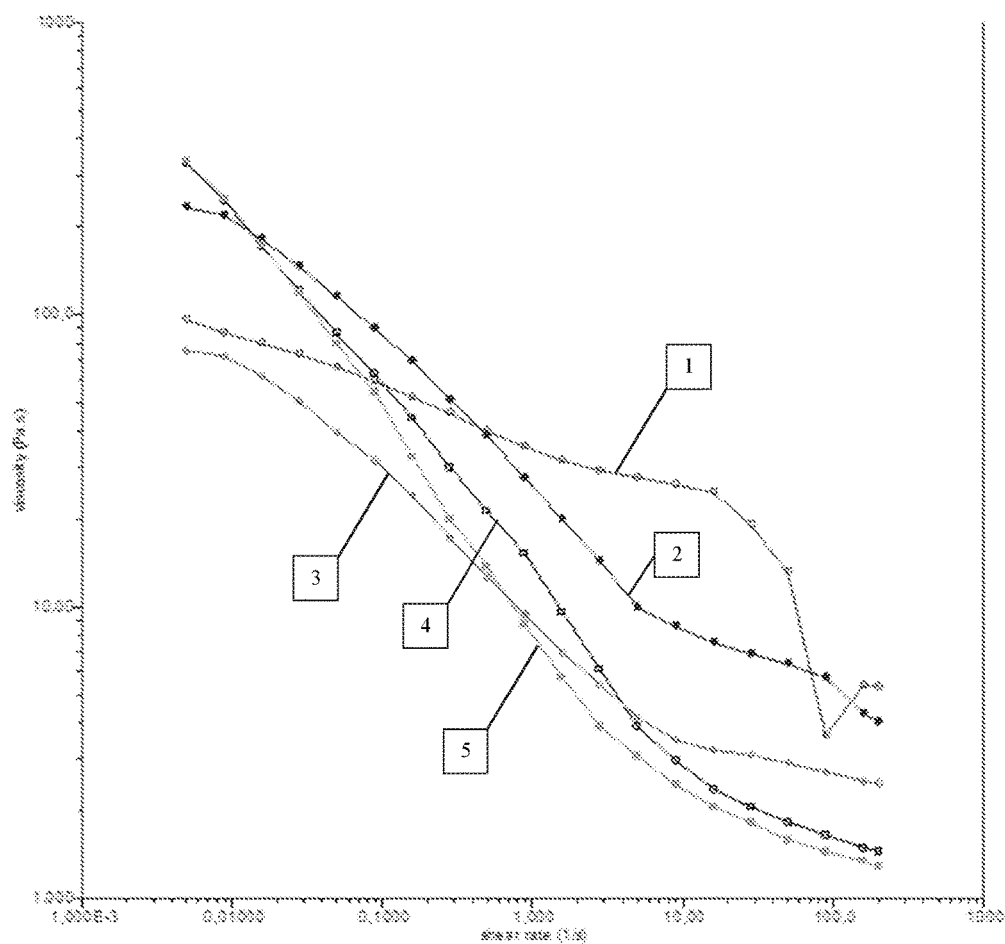

FIG. 8 shows similar graphs for a blend of 55 wt-% of PLA and 45 wt-% of PBS. Graph 1 represents an untreated extrudate of said blend, sampled from the nozzle of an extruder, graph 2 represents as reference an untreated film of said blend, remelted at 290° C. for the measurements, and graphs 3-5 represent films of said blend treated with EB radiation dosages of 50 kGy, 100 kGy and 200 kGy, respectively, and then remelted for the measurements. At lower shear rates below 5 1/s the viscosity appears to turn upwards as the dosage grows from 50 and 100 kGy, which might speculatively be explained as increased EB radiation inducing cross-linking of PBS as a reaction competing with chain splitting of PLA. However, at the shear rates of about 5 to 50 1/s as relevant to heat-sealing the viscosity decreases each time the radiation dosage is increased, suggesting that the effect of any cross-linking of the polymer is immaterial, while polymer chain breaking dominates the viscosity behaviour.

In order to determine the effect of EB radiation to adhesion of an extruded coating layer to a fibrous substrate a test series was performed with an extruded monolayer of 35 g/m$^2$ of PLA onto a web of paperboard. The extruded coating layer was then subjected to varying dosages of EB radiation. Adhesion to the surface of the board web, through ease of peeling off of the coating, was gauged on a scale of
0=no adhesion
1=slight sticking to the web
2=sticking to the web
3=firmly sticking to the web
4=firmly sticking to the web, tearing some fibres
5=firmly sticking to the web, tearing a lot of fibres The EB radiation dosages were 0 kGy, 25 kGy, 50 kGy, 100 kGy and 200 kGy, and the levels of adhesion on the above scale were 2, 3, 3, 5 and 5, respectively. In other words, a dosage of 100 kGy turned out to improve adhesion from adequate to excellent, as the PLA coating layer no longer peeled off from the fibrous surface along the borderline between the board and the coating, but an attempted peeling caused tearing of the structure within the board. This is the standard requirement for perfect adhesion.

Another test series was conducted with an extruded monolayer of 40 g/m² of PET onto a web of paperboard. The EB radiation dosages were 0 kGy, 25 kGy, 50 kGy, 100 kGy and 200 kGy, and the levels of adhesion on the above scale were 3, 4, 4, 4, 4, respectively. Thus an improved adhesivity was detected at each dosage of EB radiation as compared to a reference sample untreated with EB.

The invention claimed is:

1. A method of improving heat-sealability of a polyester, comprising coating a layer of polyester on a fibrous substrate comprising paper, paperboard or cardboard, in the absence of any cross-linking catalyst for the polyester in said coating layer, and subjecting the coating layer to electron beam (EB) radiation, decreasing the melt viscosity of the polyester
wherein the dosage of EB radiation is in the range of 20-200 kGy.

2. The method of claim 1, wherein the polyester comprises polylactide (PLA).

3. The method of claim 2, wherein the polyester is a blend of PLA and polybutylene succinate (PBS).

4. The method of claim 1, wherein polyester comprises polyethylene terephthalate (PET).

5. The method of claim 1, wherein the polyester comprises polybutylene adipate terephthalate (PBAT).

6. The method of claim 1, wherein the polyester is subjected to ultraviolet (UV) radiation and electron beam (EB) radiation in succession.

7. The method of claim 1, wherein the polyester is subjected to flame treatment.

8. The method of claim 1, wherein the polyester comprises polybutylene adipate terephthalate (PBAT) as a blend with PLA.

9. A method for increasing adhesion of polyester to a fibrous substrate comprising paper, paperboard or cardboard, comprising extruding a monolayer of the polyester onto the substrate, in the absence of any cross-linking catalyst for the polyester in said monolayer and subjecting the extruded monolayer to electron beam (EB) radiation
wherein the dosage of EB radiation is in the range of 20-200 kGy.

10. A method of manufacturing a heat-sealed container or package, comprising providing a fibrous substrate comprising paper, paperboard or cardboard with a polymer coating layer, which comprises polyester, in the absence of any cross-linking catalyst for the polyester in said coating layer, subjecting the coating to EB radiation, and forming the container or package by heat-sealing the coating polymer
wherein the dosage of EB radiation is in the range of 20-200 kGy.

11. The method of claim 10, wherein the polymer coating layer on the fibrous substrate is heat-sealed to an uncoated fibrous surface.

12. The method of claim 11, wherein the container is a paperboard cup, the vertical seam of the cup mantle being formed by heat-sealing polymer-coated inner surface of the cup to uncoated outer surface of the cup.

13. The method of claim 11, wherein the package is a paperboard or cardboard box package, the polymer-coated outer surface of the package being heat-sealed to uncoated inner surface of the package.

14. The method of claim 10, wherein the package comprises a paperboard or cardboard cup or tray, which is closed by heat-sealing lid to the mouth of the cup or tray.

15. A method of sealing a polyester coating on a fibrous substrate comprising paper, paperboard or cardboard, comprising providing a fibrous substrate comprising paper, paperboard or cardboard with a polymer coating layer, which comprises polyester, in the absence of any cross-linking catalyst for the polyester in said coating layer, subjecting the coating to EB radiation, whereafter the radiated coating layer is heat-sealed to a countersurface,
wherein the dosage of EB radiation is in the range of 20-200 kGy.

* * * * *